United States Patent [19]

Yamano

[11] Patent Number: 5,561,633
[45] Date of Patent: Oct. 1, 1996

[54] SEMICONDUCTOR MEMORY DEVICE USING SERIAL POINTER

[75] Inventor: Satoshi Yamano, Kawasaki, Japan

[73] Assignee: Kabushiki Kaisha Toshiba, Tokyo, Japan

[21] Appl. No.: 466,086

[22] Filed: Jun. 6, 1995

Related U.S. Application Data

[62] Division of Ser. No. 306,163, Sep. 14, 1994, Pat. No. 5,469,400.

[51] Int. Cl.$^6$ ..................................................... G11C 13/00
[52] U.S. Cl. .................. 365/189.01; 365/230.03
[58] Field of Search .................. 365/230.01, 230.03, 365/189.01, 189.02, 189.04, 230.04

[56] References Cited

U.S. PATENT DOCUMENTS 4,941,127  7/1990  Hashimoto .
5,416,746  5/1995  Sato et al. ................. 365/230.03

*Primary Examiner*—Terrell W. Fears
*Attorney, Agent, or Firm*—Loeb & Loeb LLP

[57] ABSTRACT

A FIFO memory device using a serial pointer consists of first and second memory cell arrays, a row decoder for selecting a word line, first and second write registers for storing data, each write register consisting of registers, and a serial write pointer for serially selecting each register. The serial write pointer consists of pointers corresponding to the first and second write registers. The row decoder is located between the first memory cell array and the second memory cell array. In the device, in adjacent registers in each write register, the shift direction of one register indicated by said serial write pointer is opposed to the shift direction of the other register.

20 Claims, 11 Drawing Sheets

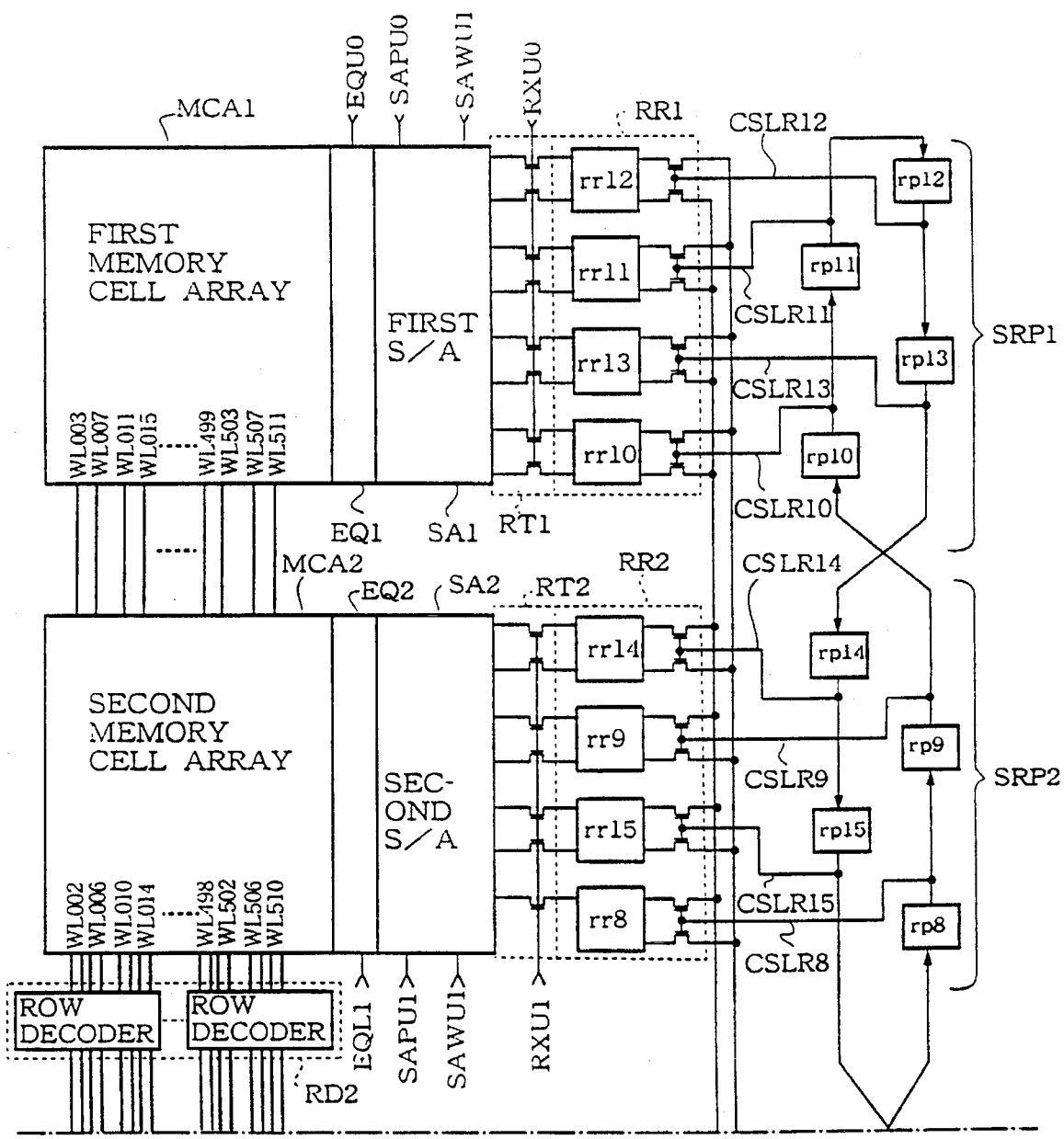

4,561,633

SEMICONDUCTOR MEMORY DEVICE USING SERIAL POINTER

This is a division of application Ser. No. 08/306,163, filed on Sep. 14, 1944. now U.S. Pat. No. 5,469,400.

BACKGROUND OF THE INVENTION

1. Field of the Invention

The present invention relates to a semiconductor memory device using a serial pointer such is a First In First Out (FIFO) semiconductor memory device, a field memory and the like, and, in particular, to a semiconductor memory device being capable of asynchronous high speed write-in and read-out during serial input and output of data to memory elements of the semiconductor memory device using a serial pointer.

2. Description of the Prior Art

Among memories in which data is write in to and read out from a memory cell serially, such as First In First Out (FIFO) memories and field memories, a serial pointer is used to count column addresses, one address at a time, in synchronism with an external serial clock signal, to select a column.

FIG. 1 is a configuration drawing of a conventional First In First Out (FIFO) semiconductor memory device provided with a column of N bits.

FIG. 2 is a diagram for explaining the operation of a conventional serial pointer including a required number of pointers used for the conventional FIFO memory device shown in FIG. 1.

First, an operation for writing data into memory cells will be explained.

Each of data input transferred from an external device has a value of digital "1" ("H" level) or digital "0" ("L" level) in an input buffer (not shown). These data are transferred to write-data lines (not shown), and data from a column address 1 to a column address N/2 are serially received in sequence to a first write register WR1 based on the serial write pointers.

When data have been received to all the bits of the first write register WR1, a word line for selecting the row direction of a memory cell array is selected by a row decoder RD controlled by an internal circuit in the FIFO semiconductor memory device (chip), and the data in the first write register WR1 is written into a first memory cell array MCA1 through a first write transfer gate WT1.

Simultaneously, data from an address (N/2)+1 to an address N are serially transferred in sequence to a second write register WR2. When the data have been received to all the bits of the second write register WR2, the data in the second write register WR2 are written into a second memory cell array MCA2 through a second write transfer gate WT2, and the word line selection is completed.

The position of a serial write pointer (SWP) for selecting the N address register bit returns back to the position for selecting the first address register bit, and the above-mentioned operation is repeated so that the operation of writing to the memory cell is carried out.

Second, an operation for reading data from a memory cell will be explained.

A word line is selected to read out data from the memory cell array. The read-out data is sensed by a sense amplifier SA and amplified, then the data in the first memory cell array MCA1 is transferred to a first read register RR1 through a first read transfer gate RT1 and latched.

The data from the column address 1 to the column address N/2 of the first read register RR1 are then serially transferred in sequence by a serial read pointer SRP, transferred to data lines, and transmitted externally through an output buffer (not shown).

Simultaneously, the data in the second memory cell array MCA2 are transferred to a second read register RR2 through a second read transfer gate RT2 and latched, and the word line selection is completed.

When the data in all the bits of the first read register RR1 has been read out, the serial read pointer SRP reads out the data from the address (N/2)+1 to the address N in the second read register RR2.

Simultaneously, a word line is selected and data are read out from the memory cell. The read-out data are sensed by the sense amplifier SA and amplified, then the data in the first memory cell array MCA1 are transferred to the first read register RR1 through the first read transfer gate RT1 and latched. When the data have been read out of all the bits of the second read register RR2, the position of the serial read pointer SRP for selecting the N address register bit returns back to the pointer position for selecting the first address register bit and the above-mentioned operation is repeated so that the data are read from the memory cell.

In the conventional FIFO semiconductor memory device shown in FIG. 1, there is the problem that the delay caused by the length of a wiring is large when the serial pointer reverts to the position for selecting the first address register from the position for selecting the N address register bit because the length of the wiring is extremely long in comparison with the length of wiring or spacing between the other adjacent pointers, namely bit elements of the pointers.

In the configuration of the conventional FIFO semiconductor memory device shown in FIG. 1, when the above-mentioned read and write operations are carried out simultaneously, there is the problem that, for example, the word line for the write operation cannot be selected during the selection of the word line for the read operation.

Also, conversely, the word line for the read operation cannot be selected during the selection of the word line for the write operation. In recent years, the need for high speed serial access has increased, but it has not been possible to adequately cope with this requirement for high speed serial access for the above-mentioned reasons and the like.

SUMMARY OF THE INVENTION

Accordingly, an object of the present invention is, with due consideration to the drawbacks of such conventional FIFO semiconductor memory devices, to provide a FIFO semiconductor memory device which performs input and output of data serially to memory elements using a serial pointer wherein it is possible to provide high speed write-in and read-out operations asynchronously using uniform length of wiring between each bit element of the serial pointer in the semiconductor memory device.

As a first preferred embodiment of the present invention, a semiconductor memory device using a serial pointer, comprises:

a plurality of memory cells divided into a first memory cell array to a p-th memory cell array (where p is a random positive integer) for storing digital data, each memory cell array being arranged in rows and columns;

a row decoder, for selecting a word line in from said first to the p-th memory cell array independently, said row decoder being located between a group of said first memory cell array to the p/2-th memory cell array and a group of said (p/2+1)-th memory cell array to p-th memory cell array;

first to p-th write registers for storing data for the first to the p-th memory cell arrays, each write register comprising a plurality of registers; and a serial write pointer for serially selecting each register in the first to the p-th write registers, said serial write pointer comprising a plurality of pointers corresponding to said first to p-th write registers, wherein in adjacent registers in each write register, the shift direction of one register indicated by said serial write pointer is opposed to the shift direction of the other register.

As a second preferred embodiment of the present invention, a semiconductor memory device using a serial pointer, comprises:

a plurality of memory cells divided into a first memory cell array to a p-th memory cell array (where p is a random positive integer) for storing digital data, each memory cell array being arranged in rows and columns;

a row decoder, for selecting a word line in from said first to the p-th memory cell array independently, said row decoder being located between a group of said first memory cell array to the p/2-th memory cell array and a group of said (p/2+1)-th memory cell array to p-th memory cell array;

first to p-th read registers for storing data from the first to the p-th memory cell arrays, each read register comprising a plurality of registers; and a serial read pointer for serially selecting each register in the first to the p-th read registers, said serial read pointer comprising a plurality of pointers corresponding to said first to p-th write registers, wherein in adjacent registers in each read register, the shift direction of one register indicated by said serial read pointer is opposed to the shift direction of the other register.

In the semiconductor memory device described above, the start point of the shift operation for the serial write pointer can be randomly set.

As a third preferred embodiment, a semiconductor memory device using a serial pointer, comprises:

a plurality of memory cells divided into a first memory cell array to a p-th memory cell array (where p is a random positive integer) for storing digital data, each memory cell array being arranged in rows and columns;

a row decoder, for selecting a word line in from said first to the p-th memory cell array independently, said row decoder being located between a group of said first memory cell array to the p/2-th memory cell array and a group of said (p/2+1)-th memory cell array to p-th memory cell array;

first to p-th read registers for storing data from the first to the p-th memory cell arrays, each read register comprising a plurality of registers; and a serial read pointer for serially selecting each register in the first to the p-th read registers, said serial read pointer comprising a plurality of pointers, each pointer corresponding to said adjacent registers in each read register, wherein in a pair of adjacent registers in each read register, the shift direction of one register pair indicated by said serial read pointer is opposed to the shift direction of the other register pair, and each pointer in the serial read pointer selects one of said pair of adjacent registers.

In the semiconductor memory device described above, the start point of the shift operation for the serial read pointer can be randomly set.

As a fourth preferred embodiment of the present invention, a semiconductor memory device using a serial pointer, comprises:

a plurality of memory cells divided into a first memory cell array to a p-th memory cell array (where p is a random positive integer) for storing digital data, each memory cell array being arranged in rows and columns;

a row decoder, for selecting a word line in from said first to the p-th memory cell array independently, said row decoder being located between a group of said first memory cell array to the p/2-th memory cell array and a group of said (p/2+1)-th memory cell array to p-th memory cell array;

first to p-th write registers for storing data from the first to the p-th memory cell arrays, each write register comprising a plurality of registers; and a serial write pointer for serially selecting each register in the first to the p-th write registers, said serial write pointer comprising a plurality of pointers, each pointer corresponding to said adjacent registers in each write register, wherein in a pair of adjacent registers in each write register, the shift direction of one register pair indicated by said serial write pointer is opposed to the shift direction of the other register pair, and each pointer in the serial write pointer selects one of said pair of adjacent registers.

In the semiconductor memory device described above, the start point of the shift operation for the serial write pointer can be randomly set.

BRIEF DESCRIPTION OF THE DRAWINGS

These and other objects, features, and advantages of the present invention will become more apparent from the following description of the preferred embodiments taken in conjunction with the accompanying drawings, in which:

FIG. 12 shows the relationship of FIGS. 12A and 12B.

FIGS. 12A and 12B are configuration diagrams of a FIFO semiconductor memory device as a second embodiment of the present invention.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Embodiments of the present invention will now be explained with reference to the drawings.

Figure 3:
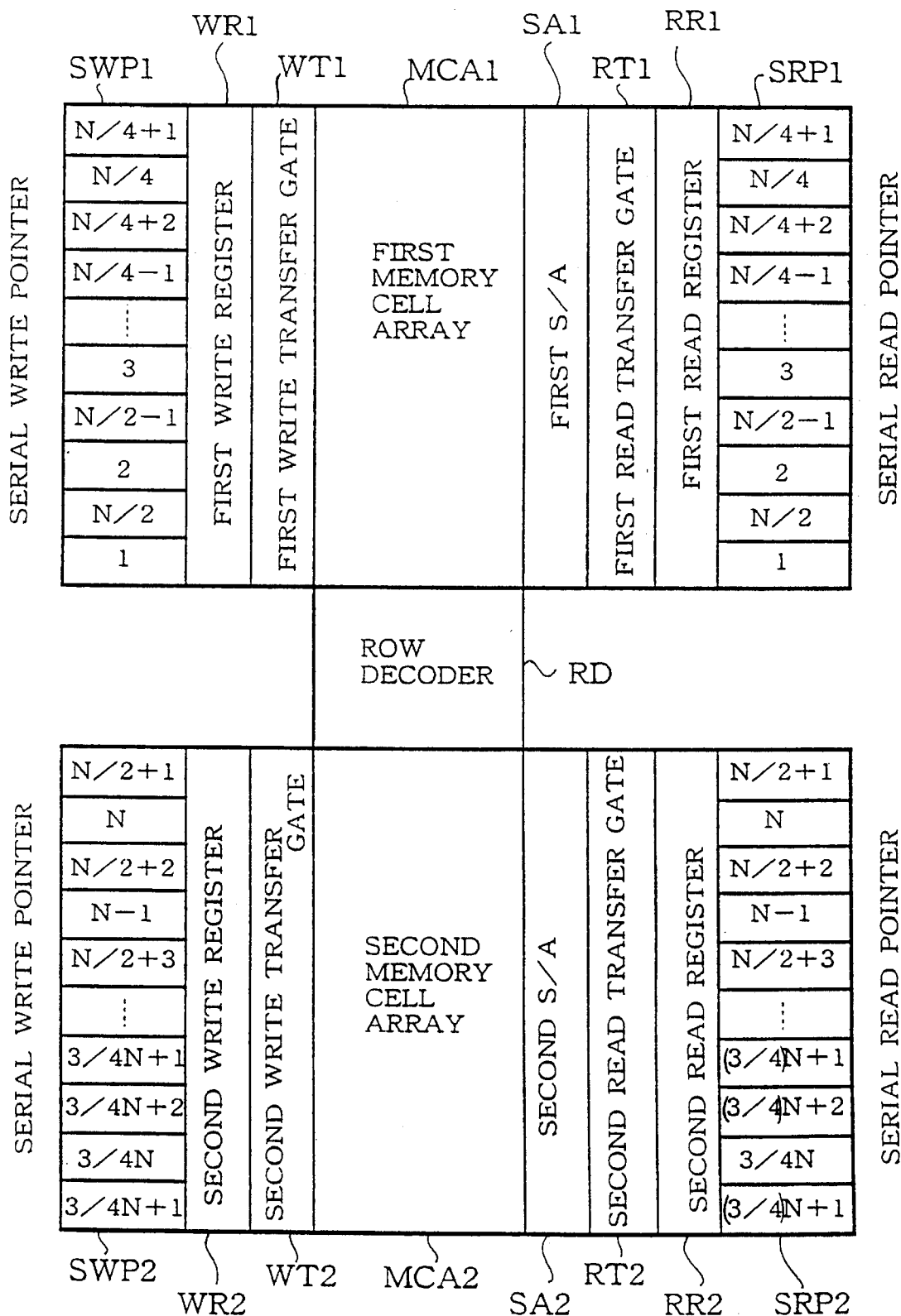
FIG. 3 is a configuration diagram of a FIFO semiconductor memory device for explaining the principles of the present invention.

In a First In First Out (FIFO) semiconductor memory device or field memory device according to the present invention, as shown in FIG. 3 for example, the memory cell array is divided into two parts (p=2), MCA1 and MCA2, and a row decoder RD which can individually select word lines for the divided memory cell arrays MCA1 and MCA2 is positioned between these memory cell arrays.

The FIFO semiconductor memory device comprises a pair of sense amplifiers SA1 and SA2 for sensing and amplifying the data stored in the memory cell array MCA1 and MCA2, write and read registers WR1, WR2, and RR1, RR2 for holding the data input to and output from the memory cells in the memory cell array MCA1 and MCA2, and serial write and read pointers SWP1, SWP2 and SRP1, SRP2 for selecting the registers serially. Each of the serial write and read pointers SWP1, SWP2 and SRP1, SRP2 consists of a predetermined number of pointers.

Figure 1:
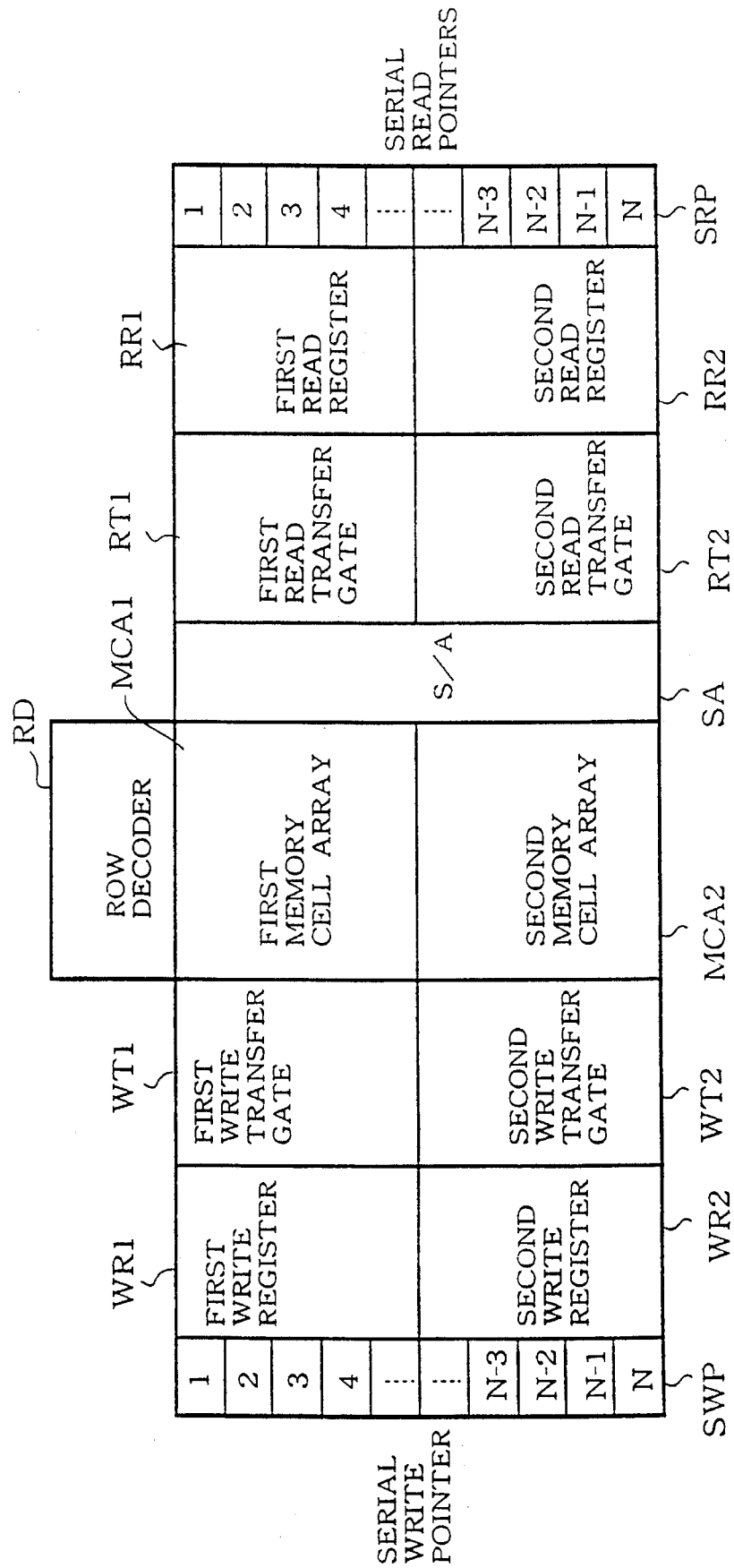
FIG. 1 is a configuration diagram of a conventional FIFO semiconductor memory device provided with a column of N bits.
Figure 2:
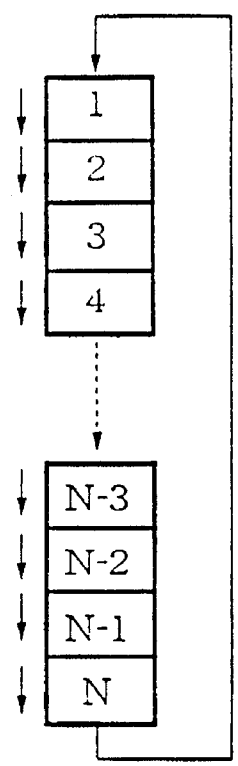
FIG. 2 is a diagram for explaining the operation of a conventional serial pointer.
Figure 4:
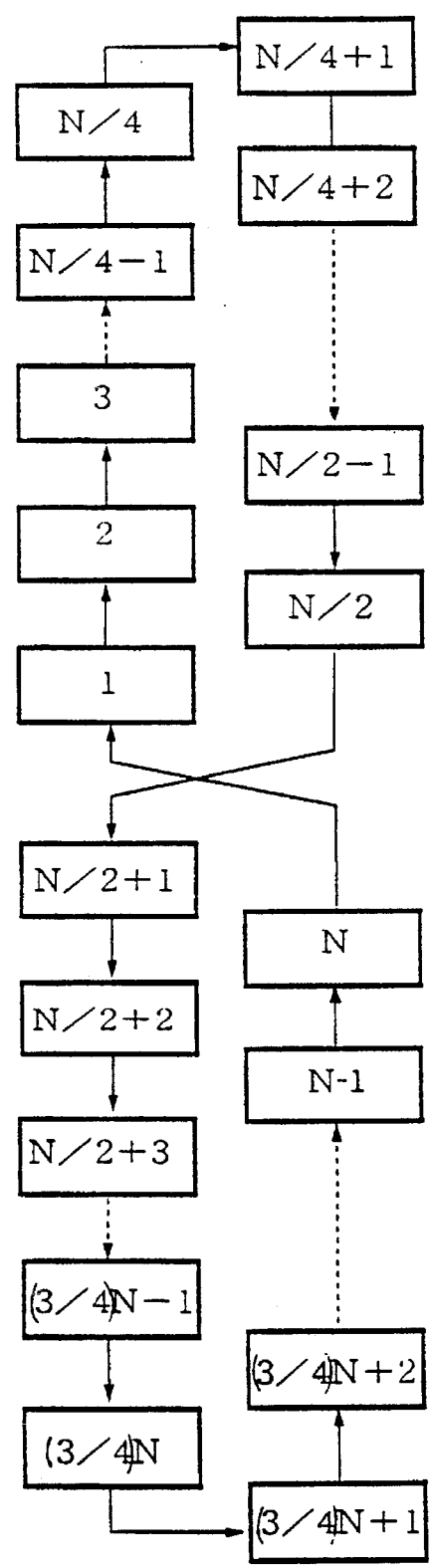
FIG. 4 is a diagram for explaining the operation of a serial read/write pointers in the FIFO semiconductor memory device of the present invention as shown in FIG.3.

The shifting of each of the serial read pointers SRP1, SRP2 and the serial write pointers SWP1, SWP2 initiate from the row decoder side of one of the two memory cell arrays, and the serial pointers are shifted alternately as shown in FIG. 4.

When the last pointer in each of the serial pointer to select one memory cell array is reached, the unselected pointer in the same serial pointer is selected and returned, then goes to other memory cell array, and the same type of shifting action described above is performed, then once again the serial pointer reverts to the starting point and the same type of shift is repeated.

Also, it is possible to set an optional order pointer or an optional bit element as the starting pointer in the serial pointer.

The operation of the example in FIG. 3 formed from a column of N bits will now be explained, with p=2.

First, a write operation will be explained. External data, which has been received from an external device, is transferred to write data lines (not shown). Data from a first column address to an N/2 column address is received serially in sequence to a first write register WR1 by means of the serial write pointer SWP1.

When data have been received to all the bits of the first write register WR1, the position of the serial write pointer SWP2 for the second memory cell array MCA2 on the opposite side is moved, and data from an N/2+1 address to an N address are received serially in sequence to the second write register WR2 by means of a serial write pointer SWP1.

Simultaneously, a word line of the first memory cell array MCA1 is selected by the row decoder RD, and data from the first write register WR1 is written into a first memory cell array MCA1 through a first write transfer gate WT1, and the word line selection is terminated.

When data have been received to all the bits of the second write register WR2, the pointer position of the serial write pointer SWP1 returns back to the bit element of the serial pointer SWP1 at which the shift operation commenced, and once again the data from the first column address to the N/2 column address is received serially in sequence to the first write register WR1.

Simultaneously, a word line for a second memory cell array MCA2 is selected by the row decoder RD, and data from the second write register WR2 are written into the second memory cell array MCA2 through a second write transfer gate WT2, and the word line selection is completed.

During the input of data to the first write register WR1, the operation of writing from the second write register WR2 into the second memory cell array MCA2 is performed. Also, during the input of data to the second write register WR2, it is possible to implement a write operation into the memory cells continuously at high speed because the operation of writing from the first write register WR1 into the first memory cell array MCA1 is performed.

Next, a read operation for the FIFO semiconductor memory device according to the present invention will be explained. The word line for the first memory cell array MCA1 is selected and data are read out from the memory cells in the memory cell array MCA1. The read-out data are sensed by a first sense amplifier SA1 and amplified, then are transferred to a first read register RR1 through a first read transfer gate RT1 and latched. The data from the column address 1 to the column address N/2 of the first read register RR1 are then serially transferred in sequence designated by the serial read pointer SRP1, transferred to read data lines (not shown), and transferred externally by an output buffer.

Simultaneously, the word line of the second memory cell array MCA2 is selected and the data in the second memory cell array MCA2 are read out from the memory cells in the memory cell array. The read-out data is sensed by the first sense amplifier SA1 and amplified, then is transferred to the second read register RR2 through the second read transfer gate RT2, and latched, and the word line selection is completed.

When the data as all of the bits of the first read register RR1 have been read out, the serial read pointer SRP2 designates the data from the address (N/2)+1 to the address N in the second read register RR2 for readout.

Simultaneously, the word line of the first memory cell array MCA1 is selected and the data is read out of the memory cell. The read-out data are sensed by the first sense amplifier SA1 and amplified, then are transferred to the first read register RR1 through the first read transfer gate RT1, and latched.

When data has been read out of all the bits of the second read register RR2, the position of the serial read pointer for selecting the N address register bit once again returns back to the bit element of the serial read pointer SRP1 for selecting the first address register bit, so that the previously-described operation is repeated.

During the data output operation from the first read register RR1, the read operation from the second memory cell array MCA2 to the second read register RR2 is performed. In addition, during the data output operation from the second read register RR2, it can be possible to implement the read operation to the memory cells in the memory cell array continuously at high speed because the read operation from the first memory cell array MCA1 to the first write register WR1 is performed.

Also, because the FIFO semiconductor memory device of the present invention requires a short time for selecting a word line, an asynchronous write operation and read operation can be performed at high speed.

As outlined in the foregoing, with the semiconductor memory device of the present invention, the distance between the bit elements in the serial pointer is almost uniform, and because there is no non-uniform layout as found in a conventional semiconductor memory device with extremely long wiring, smooth shifting is carried out at high speed. In addition, because the word lines for the memory cell array divided into P-parts are selected separately, after the selection of the word line, the write-in from the write register to the memory cell is performed by means of a write transfer gate during the write operation, and, the read-out from the memory cell to the read register is performed by means of a read transfer gate during the read operation. The selection of the word lines can be terminated immediately after the completion of these operations, therefore it is possible to implement high speed read and write operations asynchronously.

Figure 5:
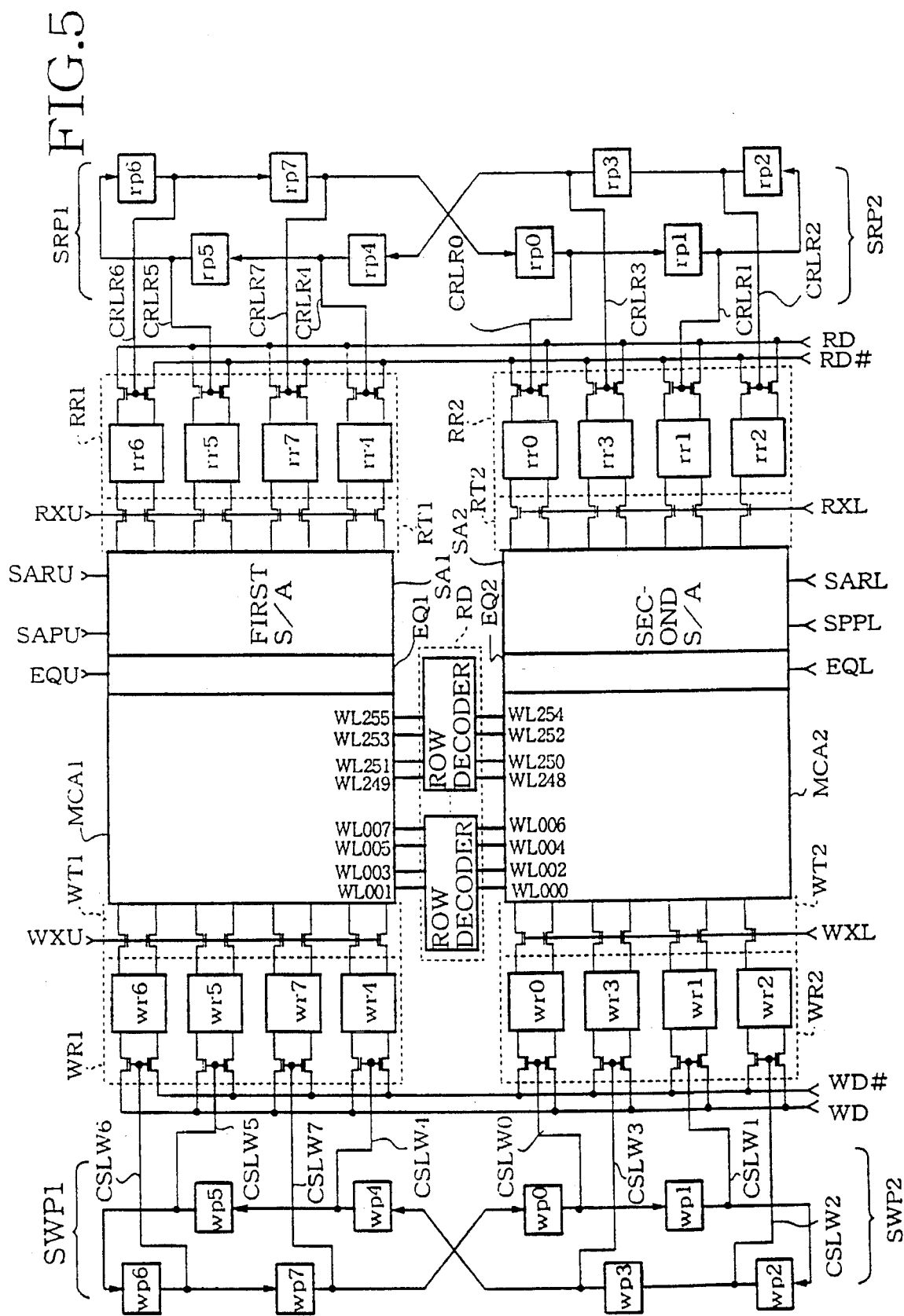
FIG. 5 is a configuration diagram of a first embodiment of a FIFO semiconductor memory device of the present invention.

FIG. 5 is a configuration diagram of a first embodiment of a semiconductor memory device of the present invention.

FIG. 5 illustrates a semiconductor memory device of the present invention comprising a two-part memory cell array, specifically, a first memory cell array MCA1 and a second memory cell array MCA2 for storing digital data, arranged in matrices, a row decoder RD for selecting word lines for the first and second memory cell arrays MCA1 and MCA2, for each memory cell array independently, first and second write registers WR1 and WR2 for storing data to be received to the first and second memory cell arrays MCA1 and MCA2, serial write pointers SWP (SWP1 and SWP2) for serially selecting the first and second write registers WR1 and WR2, first and second read registers RR1 and RR2 for storing output data for the first and second memory cell arrays MCA1 and MCA2, and serial read pointers SRP (SRP1 and SRP2) for serially selecting the first and second read registers RR1 and RR2.

Provided at the periphery of the first and second memory cell arrays MCA1 and MCA2 are first and second write transfer gates WT1 and WT2, first and second equalization circuits EQ1 and EQ2, first and second sense amplifiers SA1 and SA2, and first and second read transfer gates RT1 and RT2.

Figure 6:
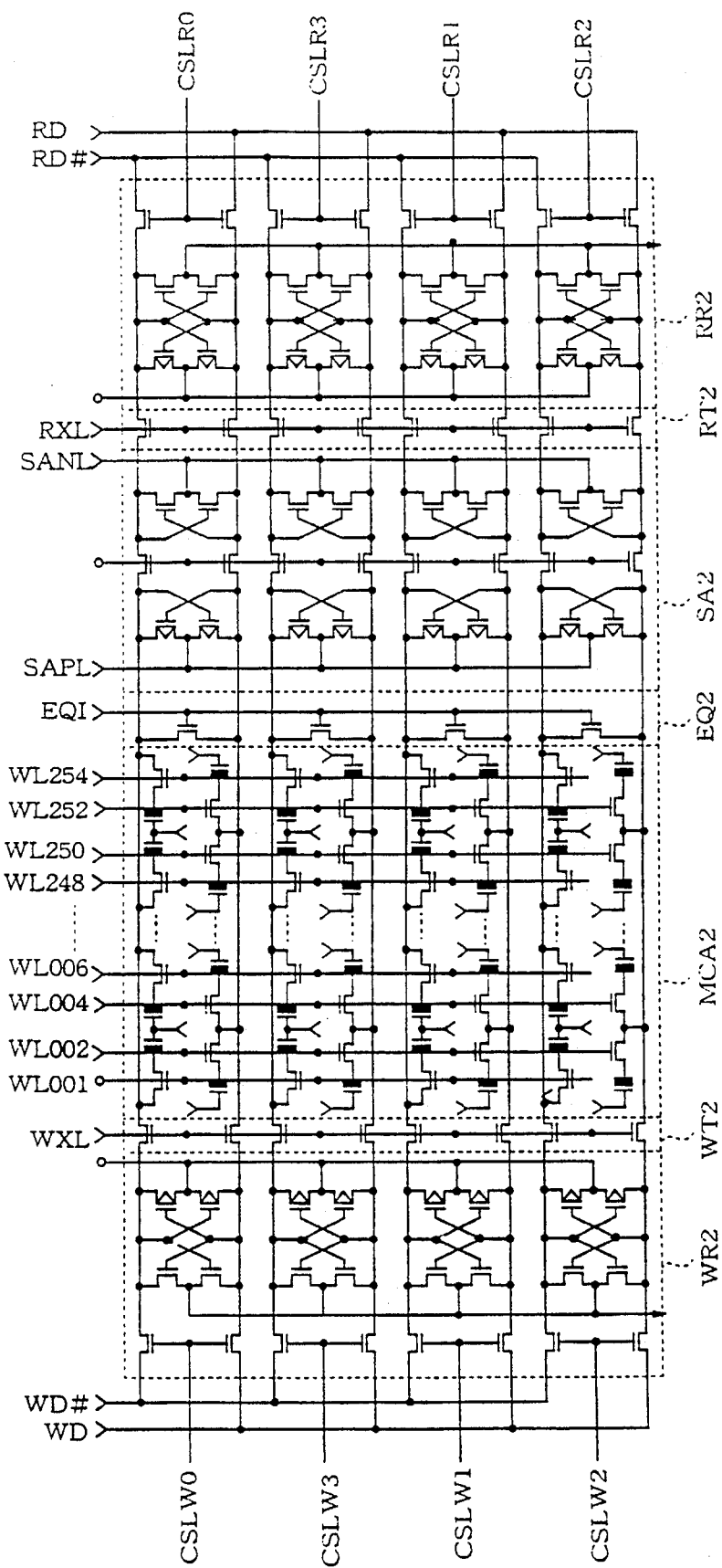
FIG. 6 is a detailed circuit diagram of a second write register, a second write transfer gate, a second memory cell array, a second equalization circuit, a second sense amplifier, a second read transfer gate, and a second read register of the first embodiment.
Figure 7:
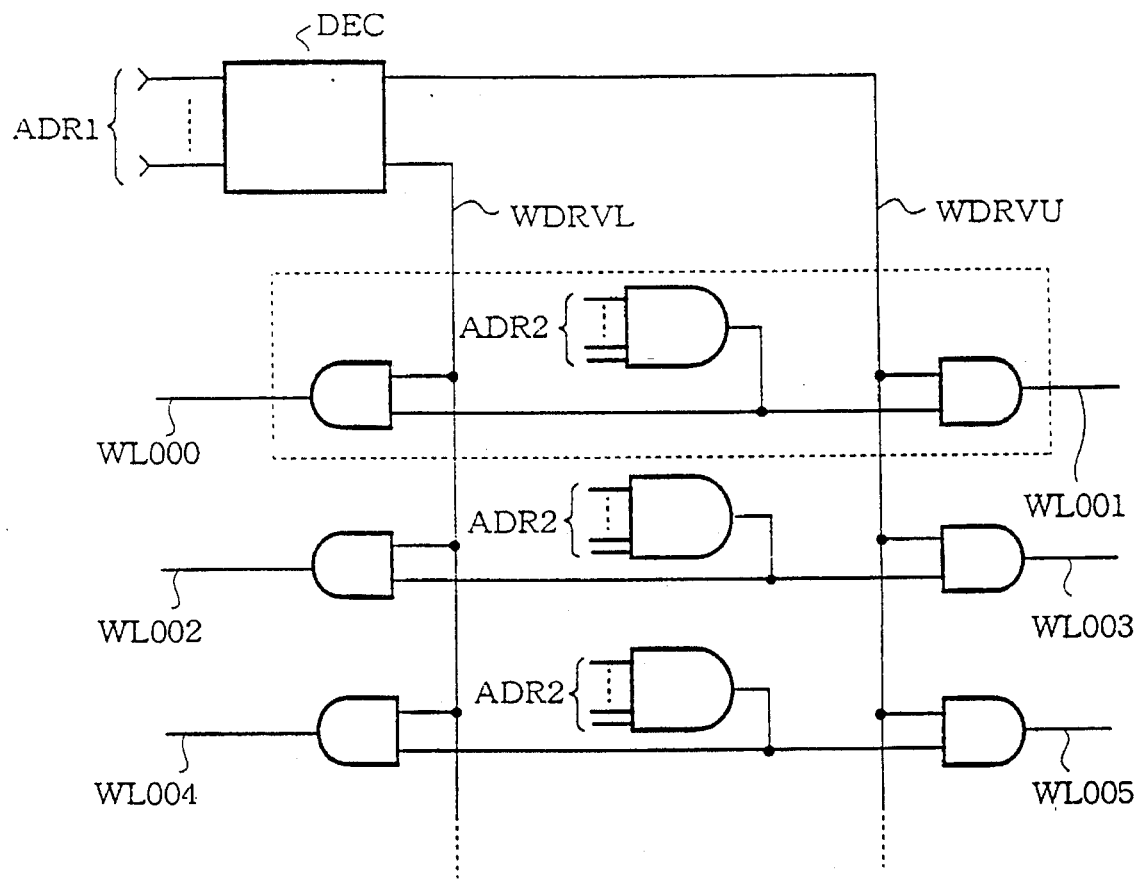
FIG. 7 is a circuit configuration diagram of a row decoder in the FIFO semiconductor memory device shown in FIG. 5.

FIG. 6 is a detailed circuit diagram of the second write register WR2, the second write transfer gate WT2, the second memory cell array MCA2, the second equalization circuit EQ2, the second sense amplifier SA2, the second read transfer gate RT2, and the second read register RR2. FIG. 7 is a circuit configuration diagram of the row decoder RD. An address ADR transferred from an external device is decoded by a decoder DEC, either one of a pair of signal lines WDRVL, WDRVU is switched from low to high ("H" level), and, based on the resulting signal, signals are produced in word lines WL000, WL002, . . . , WL254 for the first memory cell array MCA1, and in word lines WL001, WL003, . . . , WL255 for the second memory cell array MCA2.

Figure 8:
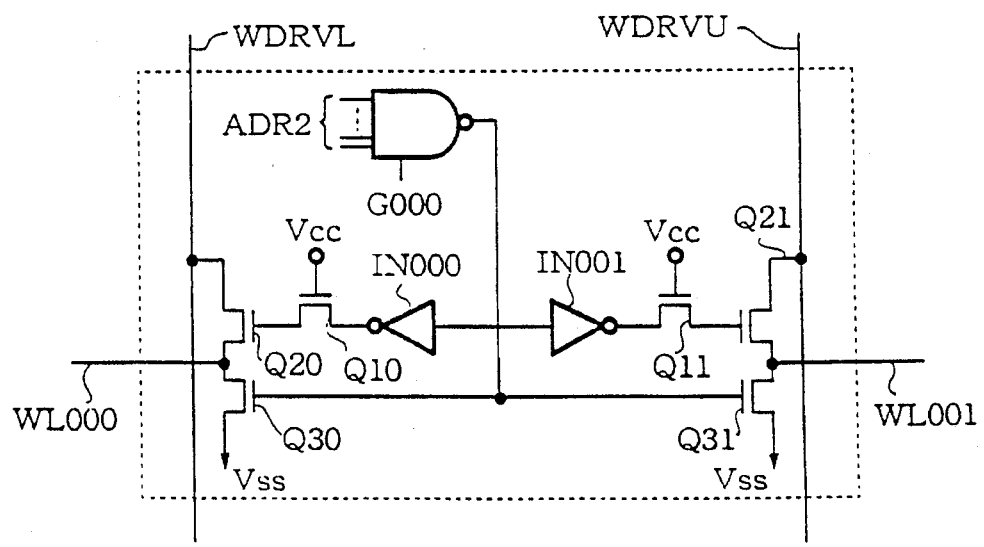
FIG. 8 is a detailed circuit diagram of the part of FIG. 7 enclosed by the dotted line shown in FIG. 7.

FIG. 8 is a detailed circuit diagram of the part of FIG. 7 enclosed by the dotted line. As illustrated in this diagram, the word lines WL000 and WL001 are switched from low to high by means of a so-called boot strap circuit, based on the results of the decoding of the address ADR by means of the signal lines WDRVL and WDRVU and a gate G000.

Figure 9:
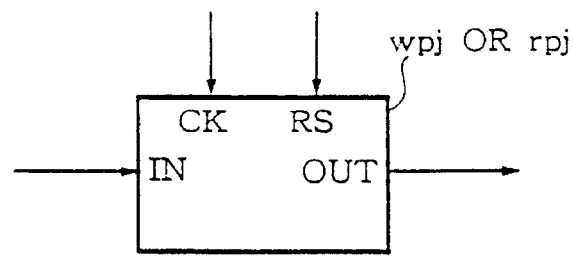
FIG. 9 is a diagram for explaining the circuit symbols for one-bit elements which form a serial write pointer and a serial read pointer used in the FIFO semiconductor memory device shown in FIG. 5.

FIG. 9 is a diagram for explaining the circuit symbols for one-bit elements which form a serial write pointer SWP and a serial read pointer SRP.

Figure 10:
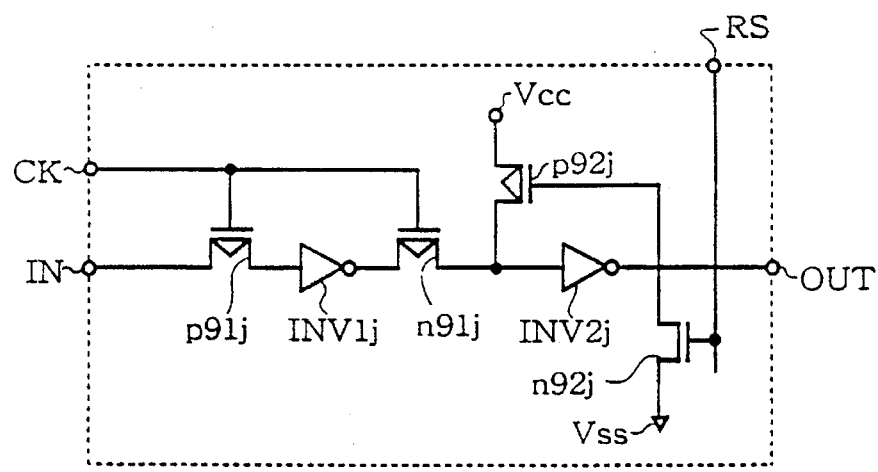
FIG. 10 is a detailed circuit diagram of the one-bit elements (wp1 to wp7 and rp1 to rp7).

FIG. 10 is a detailed circuit diagram of one-bit elements (wp1 to wp7 and rp1 to rp7).

Figure 11:
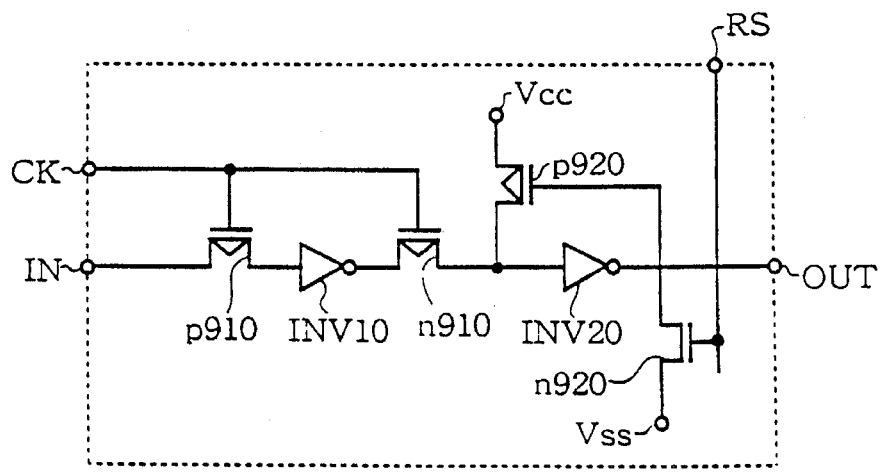
FIG. 11 is a detailed circuit diagram of the bit elements which are the initial points of the serial pointers (wp0 and rp0).

FIG. 11 is a detailed circuit diagram of the bit elements (wp0 and rp0) which are the initial points of the serial pointers.

In FIG. 11, the alphabetic symbol IN designates an input terminal, OUT denotes an output terminal, CK designates a clock signal terminal, and RS denotes a reset signal terminal. With the configuration shown in this diagram, a shift operation is performed on the serial write pointer SWP and the serial read pointer SRP based on the clock signals, because the reset signal is active ("H") level), as initial conditions whereby the output OUT of the bit elements wp0 and rp0, which are the initial points of the serial pointers are at the "H" level, and the output OUT of the other bit elements wp0 and rp0 are at the "L" level.

Also, in the connections of the elements wp0 to wp7 of the serial write pointer SWP, as shown in FIG. 5, the direction of the shift operation for the serial write pointer SWP, within the bit range which selects an i-th write register $WR_i$ (where, i=1, 2) is the direction of the shift operation of the adjacent pointers or adjacent bit elements in the serial write pointer SWP.

Specifically, the output CSLW0 of the bit element wp0 controls the input of the first bit element wr0 of the second write register WR2, the output CSLW1 of the bit element wp1 controls the input of the third bit element wr1 of the second write register WR2, the output CSLW2 of the bit element wp2 controls the input of the fourth bit element wr2 of the second write register WR2, and the output CSLW3 of the bit element wp3 controls the input of the second bit element wr3 of the second write register WR2.

Also, the output CSLW4 of the bit element wp4 controls the input of the fourth bit element wr4 of the first write register WR1, the output CSLW5 of the bit element wp5 controls the input of the second bit element wr5 of the first write register WR1, the output CSLW6 of the bit element wp6 controls the input of the first bit element wr6 of the first write register WR1, and the output CSLW7 of the bit element wp7 controls the input of the third bit element wr7 of the first write register WR1.

In addition., the connections of the elements rp0 to rp7 of the serial read pointer SRP are the same as for the serial write pointer SWP connection system.

Next, the operation of the semiconductor memory device of the present invention will be explained, beginning with an explanation of the write operation.

Data transferred from external devices, which has been received, are transferred to write data lines WD and WD#.

Data from a zero column address to a third column address are received serially in sequence to the second write register WR2 under the control of the serial pointer SWP2.

When data have been received to all the bits of the second write register WR2, the position of a serial pointer SWP1 of the first memory cell array MCA1 on the opposite side is changed, and data from a fourth address to a seventh address are received serially in sequence to the first write register WR1.

Simultaneously, a word line of the second memory cell array MCA2 is selected, and data from the second write register WR2 is written into the second memory cell array MCA2 through the second write transfer gate WT2, and the word line selection is terminated.

When data have been received to all the bits of the first write register WR1, the pointer position returns to the bit element wp0 of the serial pointer SWP2 at which the shift operation started, and once again the data from the zero column address to the third column address is received serially in sequence to the second write register WR2.

Simultaneously, a word line of the first memory cell array MCA1 is selected, and data from the first write register WR1 is written into the first memory cell array MCA1 through the first write transfer gate WT1, and the word line selection is terminated.

During the input of data to the second write register WR2, the operation of writing from the first write register WR1 into the first memory cell array MCA1 is performed. Also, during the input of data to the first write register WR1, it is possible to implement a write operation into the memory cells continuously at high speed because the operation of writing from the second write register WR2 into the second memory cell array MCA2 is performed.

Next, a read operation in the FIFO semiconductor memory device according to the present invention will be explained.

The word line for the second memory cell array MCA2 is selected and data are read out FROM memory cells in the memory cell array after the equalization operation is completed by the equalization circuit EQ2, and sensed by a first sense amplifier SA1 and amplified, then are transferred to the second read register RR2 through the second read transfer gate RT2 and latched.

The data from the zero column address to the third column address of the second read register RR2 are then serially transferred in sequence by the serial read pointer SRP2, transferred to read data lines RD and RD#, and transmitted to external devices through an output buffer. Simultaneously, the word line of the first memory cell array MCA1 is selected by the row decoder RD and the data are read out from the memory cells in the first memory cell array MCA1 after the equalization operation is completed by the first equalization circuit EQ1. The data is sensed by the first sense amplifier SA1 and amplified, then is transferred to the first read register RR1 through the first read transfer gate RT1, and latched, and the word line selection is completed.

When the data in all the bits of the second read register RR2 have been read out, the serial read pointer SRP1 reads out the data in the first read register RR1 from the fourth address to the seventh address.

Simultaneously, the word line of the second memory cell array MCA2 is selected by the row decoder RD and the data are read out from the memory cells in the second memory cell array MCA2 after the equalization operation is completed by the second equalization circuit EQ2. These data are sensed by the second sense amplifier SA2 and amplified, then are transferred to the second read register RR2 through the second read transfer gate RT2, and latched. When data have been read out of all the bits of the first read register RR1, the position (bit element rp7) of the serial read pointer SRP1 for selecting the seventh address register bit rr7 once again returns back to the position (bit element rp0) of the serial pointer SRP2 for selecting the zero address register bit rr0, so that the previously-described operation is repeated.

During the output of data from the second read register RR2, the operation of reading out from the first memory cell array MCA1 to the first read register RR1 is performed. In addition, during the output of data from the first read register RR1, it is possible to implement a read operation to the memory cells continuously at high speed because the operation of reading from the second memory cell array MCA2 to the second read register RR2 is performed.

Also, an asynchronous write operation and read operation can be performed at high speed because only a short time is required to select the word line.

Figure 12B:
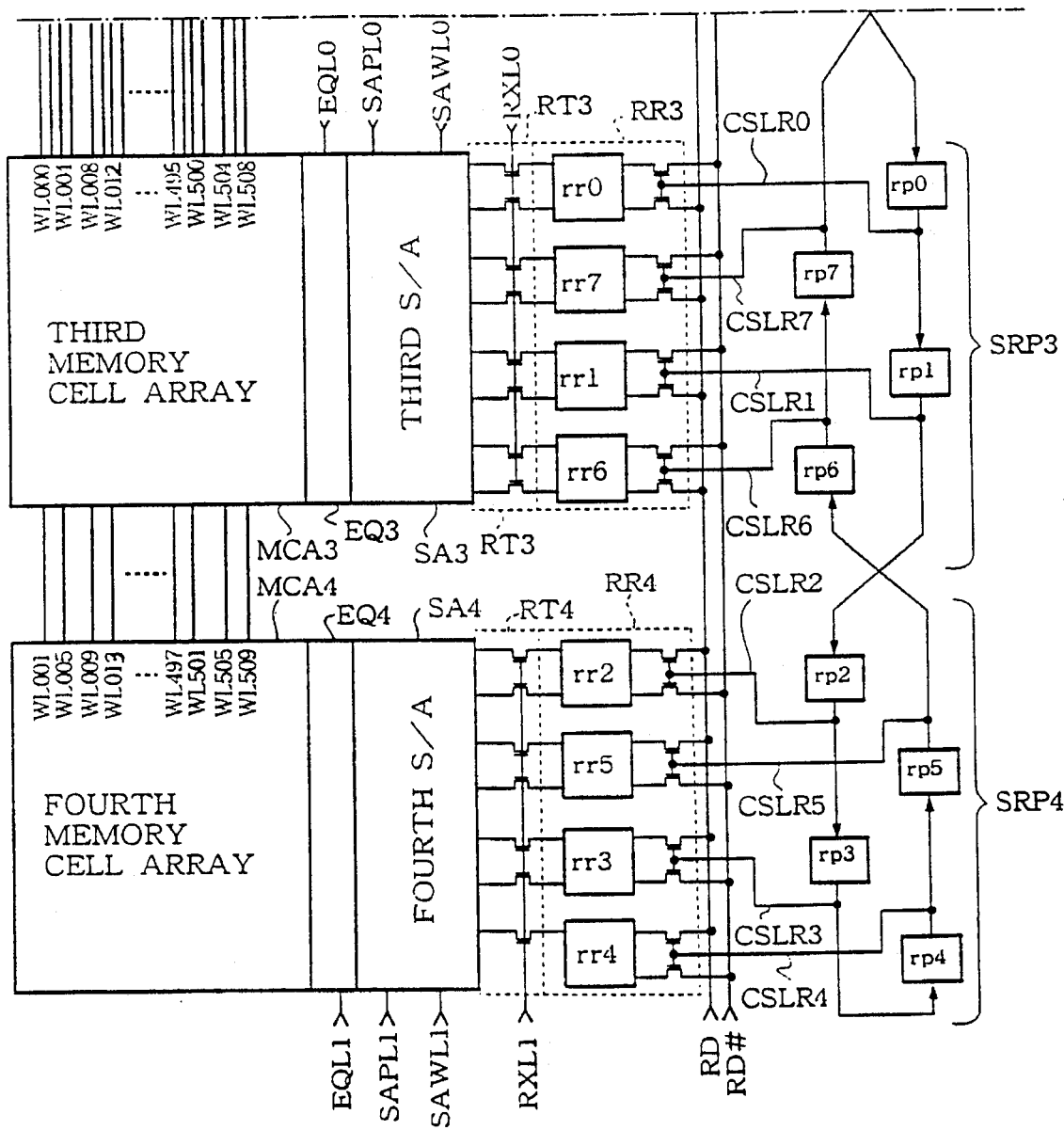

FIGS. 12A and 12B are configuration diagrams of a FIFO semiconductor memory device as a second embodiment according to the present invention.

The FIFO semiconductor memory device of the present invention, as shown in FIGS. 12A and 12B, comprises a four-part memory cell array (p=4), specifically first to fourth memory cell arrays MCA1 to MCA4 for storing digital data, arranged in a plurality of matrices, a row decoder RD2 for selecting word lines for the first to fourth memory cell arrays MCA1 to MCA4, for each memory cell array independently, first to fourth write registers WR1 to WR4 for storing data to be received to the first to fourth memory cell arrays MCA1 to MCA4, serial write pointers SWP1 to SWP4 for serially selecting the first to fourth write registers WR1 to WR4, first to fourth read registers RR1 to RR4 for storing output data for the first to fourth memory cell arrays MCA1 to MCA4, and serial read pointers SRP1 to SRP4 for serially selecting the first to fourth read registers RR1 to RR4.

At periphery sections of the first to fourth memory cell arrays MCA1 to MCA4 are provided first to fourth write transfer gates WT1 to WT4, first to fourth equalization circuits EQ1 to EQ4, first to fourth sense amplifiers SA1 to SA4, and first to fourth read transfer gates RT1 to RT4.

Also, the first to fourth write registers WR1 to WR4, the first to fourth write transfer gates WT1 to WT4, and the serial write pointers SWP1 to SWP4 on the side for writing in data to the first to fourth memory cell arrays MCA1 to MCA4 have the same configuration as the first to fourth read registers RR1 to RR4, the first to fourth read transfer gates RT1 to RT4, and the serial read pointers SRP1 to SRP4 for reading out data, and are therefore omitted from FIGS. 12A and 12B.

Figure 13:
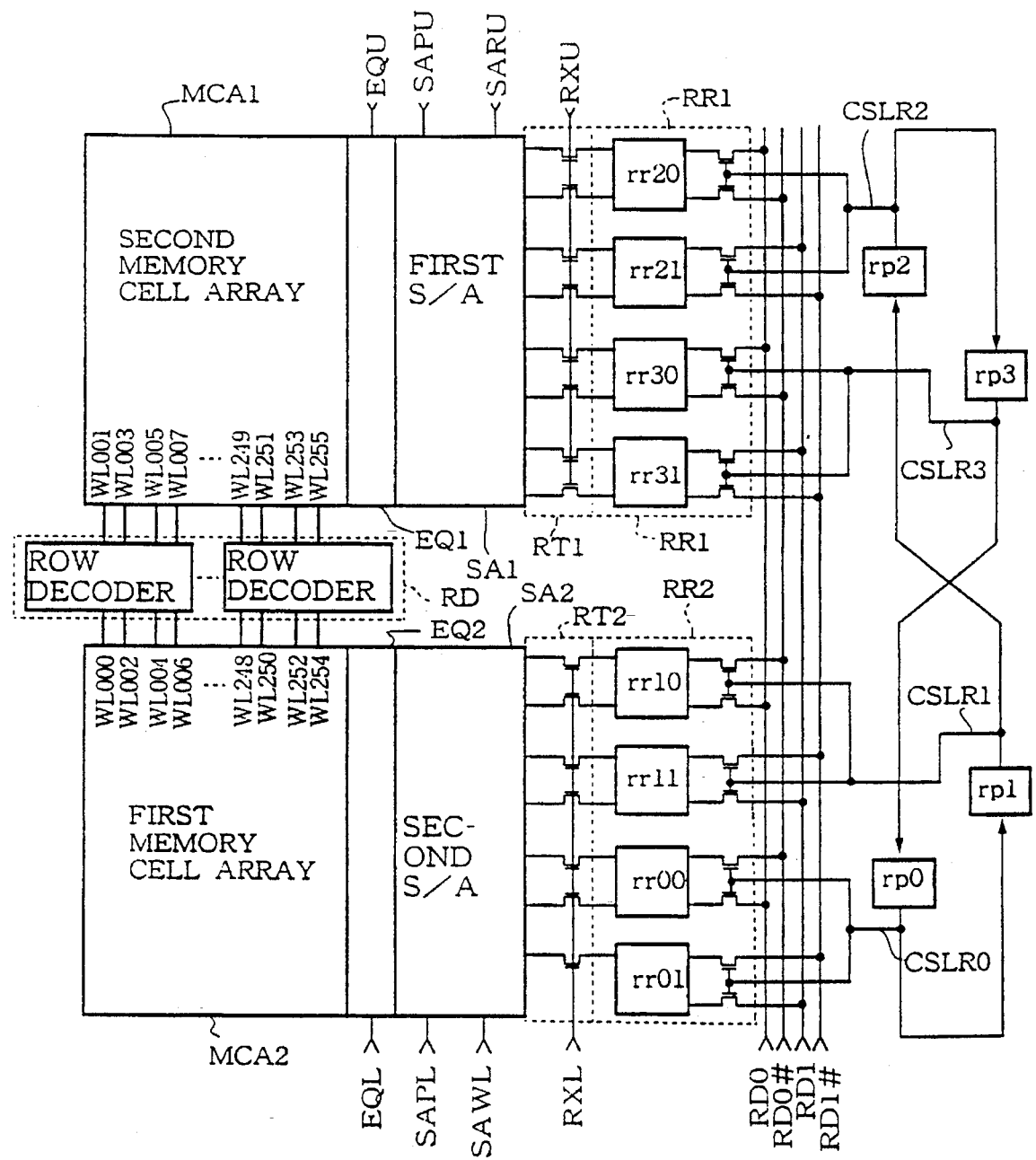
FIG. 13 is a configuration diagram of a FIFO semiconductor memory device as a third embodiment of the present invention.

The second embodiment of the FIFO semiconductor memory device has a configuration whereby it is divided into four memory cell arrays, that is, p=4, therefore the detailed configuration diagram and operation of each structural element is the same as for the first embodiment, as shown in FIG. 3. - FIG. 13 is a configuration diagram of a FIFO semiconductor memory device as a third embodiment according to the present invention.

FIG. 13 illustrates the FIFO semiconductor memory device of the present invention comprising a two-pan memory cell array, specifically, a first memory cell array MCA1 and a second memory cell array MCA2 for storing digital data, arranged in a plurality of matrices, a row decoder RD for selecting word lines for the first and second memory cell arrays MCA1 and MCA2, for each memory cell array independently, first and second write registers WR1 and WR2 for storing data to be received to the first and second memory cell arrays MCA1 and MCA2, a serial write pointer SWP for serially selecting the first and second write registers WR1 and WR2, first and second read registers RR1 and RR2 for storing output data for the first and second memory cell arrays MCA1 and MCA2, and a serial read pointer SRP for serially selecting the first and second read registers RR1 and RR2.

At the periphery sections of the first and second memory cell arrays MCA1 and MCA2 are first and second write transfer gates WT1 and WT2, first and second equalization circuits EQ1 and EQ2, first and second sense amplifiers SA1 and SA2, and first and second read transfer gates RT1 and RT2.

Also, in FIG. 13, the first and second write registers WR1 and WR2, the first and second write transfer gates WT1 and WT2, and the serial write pointer SWP on the side for writing in data to the first and second memory cell arrays MCA1 and MCA2 have the same configuration as the first and second read registers RR1 and RR2, as shown in FIGS. 3 and 12, the first and second read transfer gates RT1 and RT2, and the serial read pointer SRP for reading out data, and are therefore omitted from FIG. 13.

Figure 14:
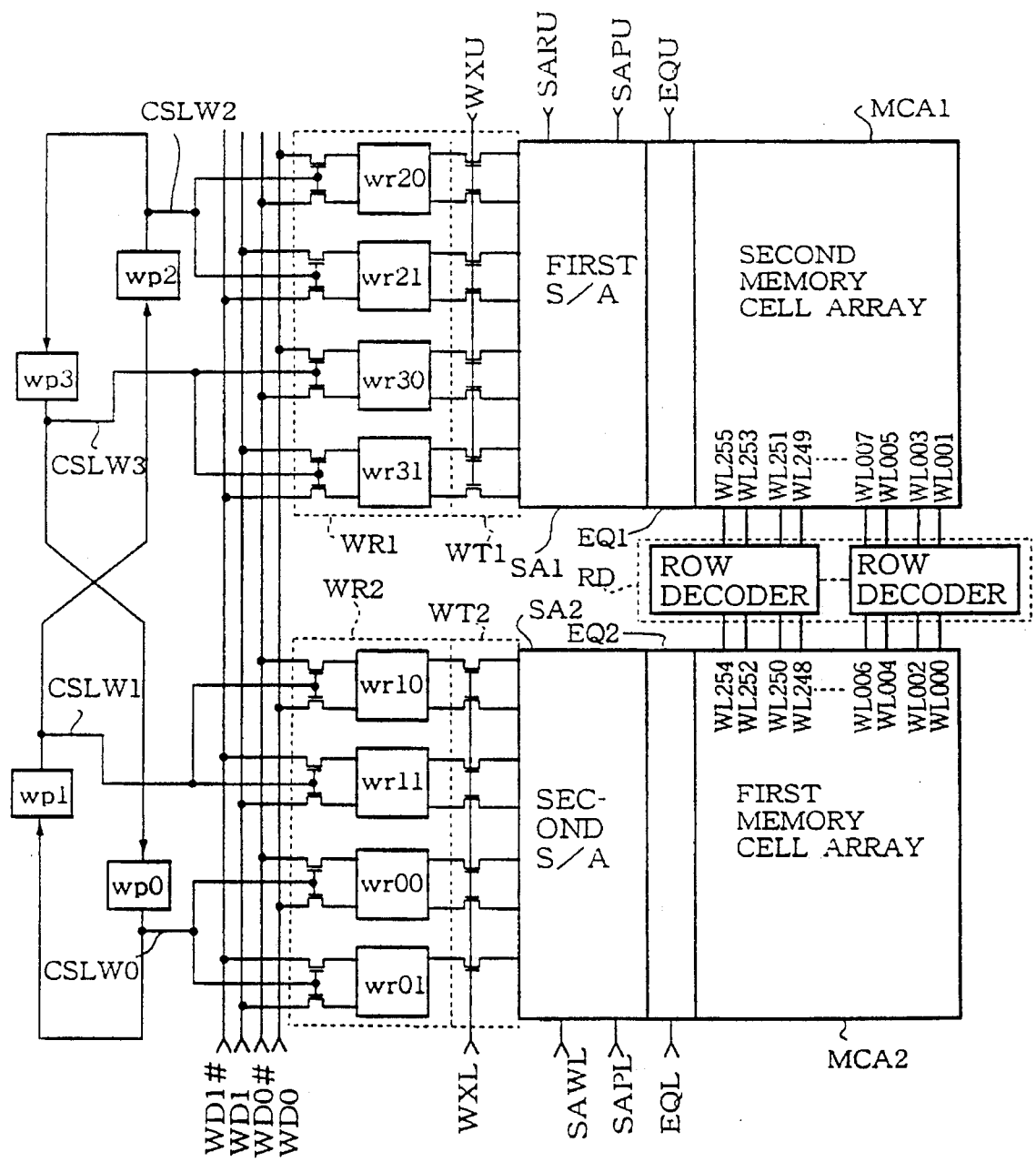
FIG. 14 is a configuration diagram of a FIFO semiconductor memory device as a fourth embodiment of the present invention.

FIG. 14 is a configuration diagram of a FIFO semiconductor memory device as a fourth embodiment of the present invention. In the fourth embodiment, the relationship between first and second write registers WR1, WR2 and serial write pointer SWP for writing in data to the first and second memory cell arrays MCA1 and MCA2 are illustrated in detail. Other compositional elements of the FIFO semiconductor memory device of the fourth embodiment, such as first and second write transfer gates WT1 and WT2, and first and second read registers RR1 and RR2 have the same configuration of the first and second embodiment as shown in FIGS. 3 and 12. Therefore, the explanations of these configurational elements are omitted from this specification.

Compared to the FIFO semiconductor memory device as the first embodiment in configuration, in the FIFO semiconductor memory device as the second embodiment, the serial write pointer SWP and the serial read pointer SRP are made up of four bit elements wp0 to wp3 and rp0 to rp3 respectively, and two register bits are selected simultaneously by one bit element.

On the write-in side, write data is received through two groups of write data lines WD0, WD0# and WD1, WDi#, while, on the read-out side, read data is transferred through two groups of read data lines RD0, RD0# and RD1, RDI#.

Because the detailed configuration diagram and operation of the other structural elements in the FIFO semiconductor memory device as the third embodiment of the present invention is the same as for the first embodiment as shown in FIG. 3, the detailed configuration and the operation of other structural elements are omitted here.

As outlined in the foregoing, in the FIFO semiconductor memory devices of the present invention which performs input and output of data serially to memory elements using a serial pointer, a smooth shifting operation can be carried out at high speed by providing uniform wiring between the adjacent bit elements such as adjacent pointers in each of the serial read/write pointers.

In addition, because the word lines for the memory cell array divided into p parts are selected separately, it is possible to provide high speed write-in and read-out asynchronously.

What is claimed is:

1. A semiconductor memory device comprising:

a first memory cell array having a plurality of rows and columns of memory cells;

a first sense amplifier array coupled to the memory cells of the first memory cell array, the first sense amplifier array providing complementary data pairs to a plurality of first data lines;

a first read register for storing a plurality of the complementary data pairs output by the first sense amplifier array;

a second memory cell array having a plurality of rows and columns of memory cells;

a second sense amplifier array coupled to the memory cells of the second memory cell array, the second sense amplifier array providing complementary data pairs to a plurality of second data lines;

a second read register for storing a plurality of the complementary data pairs output by the second sense amplifier array;

at least four read data lines coupled to the first read register and the second read register; and a serial read pointer for selecting two adjacent complementary data pairs from the first and the second read register for output to the at least four read data lines, wherein a shift direction of the serial read pointer in the first read register is opposite to a shift direction of the serial read pointer in the second read register.

2. A semiconductor memory device comprising:

a first memory cell array having a plurality of first memory cells arranged in matrix, a plurality of first bit line pairs and a plurality of first word lines, the first memory cells in the same column sharing a first common bit line pair from said plurality of first bit line pairs, the memory cells in the same row sharing a first common word line from said plurality of first word lines;

a second memory cell array having a plurality of second memory cells arranged in matrix, a plurality of second bit line pairs and a plurality of second word lines, the memory cells in the same column sharing a second common bit line pair from said plurality of second bit line pairs, the memory cells in the same row sharing a second common word line from said plurality of second word lines;

a serial data bus;

a plurality of switch circuits divided into a first switch circuit group and a second switch circuit group in which each switch circuit of the plurality of switch circuits is connected between the data bus and corresponding bit line pairs of the first bit line pairs and the second bit line pairs; and a serial pointer having first, second, third and fourth shift register groups, the first, second, third and fourth shift register groups successively connected to make a ring, data in the first shift register groups sequentially transferred along a first direction, data in the second shift register groups sequentially transferred along a second direction, data in the third shift register groups sequentially transferred along the second direction, data in the fourth shift register groups sequentially transferred along the first direction, the first and the second shift register groups controlling the first switch circuit group corresponding to the plurality of first bit line pairs in the first memory cell array, and the third and fourth shift register groups controlling the second switch circuit group corresponding to the plurality of second bit line pairs in the second memory cell array.

3. The semiconductor memory device according to claim 2, further comprising:

a first sense amplifier array having a first plurality of sense amplifier circuits, each sense amplifier circuit of the first sense amplifier array connected to corresponding one of the plurality of first bit line pairs in the first memory cell array; and a second sense amplifier array having a second plurality of sense amplifier circuits, each sense amplifier circuit of the second sense amplifier array connected to corresponding one of the plurality of second bit line pairs in the second memory cell array;

wherein the first and the second sense amplifier arrays are independently activated.

4. The semiconductor memory device according to claim 3, further comprising:

a first register array having a plurality of first registers, in which each first register is connected to corresponding one of the plurality of first bit line pairs in the first memory cell array; and a second register array having a plurality of second sense registers, in which each second register is connected to corresponding one of the plurality of second bit line pairs in the second memory cell array, wherein each first register and each second register independently latch data from the corresponding one of the plurality of first bit line pairs and the plurality of second bit line pairs, respectively.

5. The semiconductors memory device according to claim 4, wherein each first register of the first register array stores data read from the first memory cell array, and each second register of the second register array stores data read from the second memory cell array, so that the data read from the first and second memory cells are successively outputted through the serial data bus.

6. A semiconductor memory device comprising:

a first memory cell array having a plurality of first memory cells arranged in matrix, a plurality of first read bit line pairs and first write bit line pairs and a plurality of first word lines, the first memory cells in the same column sharing a first common bit line pair from said plurality of first read bit line pairs and write bit line pairs, the memory cells in the same row sharing a first common word line from said plurality of first word lines;

a second memory cell array having a plurality of second memory cells arranged in matrix, a plurality of second read bit line pairs and second write bit line pairs and a plurality of second word lines, the second memory cells in the same column sharing a second common bit line pair from said plurality of second read bit line pairs and second write bit line pairs, the memory cells in the same row sharing a second common word line from said plurality of second word lines;

a first serial data bus;

a plurality of first switch circuits, each first switch circuit connected between the first serial data bus and the corresponding one of the plurality of first write bit line pairs and second write bit line pairs; and a first serial pointer having first, second, third and fourth shift register groups, the first, second, third and fourth shift register groups successively connected to make a ring, data in the first shift register groups sequentially transferred along the first direction, data in the second shift register groups sequentially transferred along a second direction, data in the third shift register groups sequentially transferred along a second direction, data in the fourth shift register groups sequentially transferred along the first direction, the first and the second shift register groups controlling a first set of the plurality of first switch circuits corresponding to the plurality of first write bit line pairs in the first memory cell array, and the third and fourth shift register groups controlling a second set of the plurality of switch circuits corresponding to the plurality of second write bit line pairs in the second memory cell array;

a second serial data bus;

a plurality of second switch circuits each connected between the second serial data bus and the corresponding one of the plurality of first read bit line pairs and second read bit line pairs; and a second serial pointer having fifth, sixth, seventh and eighth shift register groups, the fifth, sixth, seventh and eighth shift register groups successively connected to make a ring, data in the fifth shift register groups sequentially transferred along a third direction, data in the sixth shift register groups sequentially transferred along a fourth direction, data in the seventh shift register groups sequentially transferred along the fourth direction, data in the eighth shift register groups sequentially transferred along the third direction, the fifth and the sixth shift register groups controlling a first set of the plurality of second switch circuits corresponding to the plurality of first read bit line pairs in the first memory cell array, and the seventh and the eighth shift register groups controlling a second set of the plurality of second switch circuits corresponding to the plurality of second read bit line pairs in the second memory cell array.

7. The semiconductor memory device according to claim 6, further comprising:

a first sense amplifier array having a first plurality of sense amplifier circuits, each sense amplifier circuit of the first sense amplifier array coupled between the plurality of first switch circuits and corresponding one of the plurality of first read bit line pairs in the first memory cell array; and a second sense amplifier array having a second plurality of sense amplifier circuits, each sense amplifier circuit of the second sense amplifier array coupled between the plurality of second switch circuits and corresponding one of the plurality of second read bit line pairs in the second memory cell array;

wherein the first and the second sense amplifier arrays are independently activated.

8. The semiconductor memory device according to claim 7 further comprising:

a first read register array having a plurality of first read registers, in which each first read register is connected to corresponding one of the plurality of first write bit line pairs in the first memory cell array;

a second register array having a plurality of second registers, in which each second register is corrected to corresponding one of the plurality of second write bit line pairs in the second memory cell array;

a third register array having a plurality of third registers, in which each third register is connected to corresponding one of the plurality of first read bit line pairs in the first memory cell array; and a fourth register array having a plurality of fourth registers, in which each fourth register is connected to corresponding one of the plurality of second read bit line pairs in the second memory cell array;

wherein each first register, each second register independently latch data into the corresponding one of the plurality of first write bit line pairs and the plurality of second write bit line pairs, and each third register and each fourth register independently latch data from corresponding one of the plurality of first read bit line pairs and the plurality of second read bit line pairs.

9. The semiconductors memory device according to claim 8, wherein each first register stores data to be stored in the first memory cell array, each second register stores data to be stored in the second memory cell array, each third register stores data read from the first memory cell array, and each fourth register stores data read from the second memory cell array, so that data read from the first and second memory cell arrays are successively outputted through the second serial data bus and data to be stored in the first and second memory cell arrays are successively inputted from the first serial data bus.

10. A semiconductor memory device comprising:

a first memory cell array having a plurality of first memory cells arranged in matrix, a plurality of first bit line pairs and a plurality of first word lines, the first memory cells in the same column sharing a first common bit line pair, the memory cells in the same row sharing a first common word line from the plurality of first word lines;

a second memory cell array having a plurality of memory cells arranged in matrix, a plurality of second bit line pairs and a plurality of word lines, the second memory cells in the same column sharing a second common bit line pair, the memory cells in the same row sharing a second common word line from the plurality of second word lines;

a third memory cell array having a plurality of memory cells arranged in a matrix, a plurality of third bit line pairs and a plurality of word lines, the third memory cells in the same column sharing a third common bit line pair, the memory cells in the same row sharing a third common word line from the plurality of third word lines;

a fourth memory cell array having a plurality of memory cells arranged in matrix, a plurality of fourth bit line pairs and a plurality of word lines, the fourth memory cells in the same column sharing a fourth common bit line pair, the memory cells in the same row sharing a fourth common word line from the plurality of fourth word lines;

a serial data bus;

a plurality of switch circuits, each switch circuit connected between the data bus and the corresponding one of the plurality of first, second, third and fourth bit line pairs; and a serial pointer having first, second, third, fourth, fifth, sixth, seventh and eighth shift register groups, the first, second, third, fourth, fifth, sixth, seventh and eighth shift register groups successively connected to make a ring, data in the first shift register groups sequentially transferred along a first direction, data in the second shift register groups sequentially transferred along a second direction, data in the third shift register groups sequentially transferred along the second direction, data in the fourth shift register groups sequentially transferred along the second direction, data in the fifth shift register groups sequentially transferred along the second direction, data in the sixth shift register groups sequentially transferred along the first direction, data in the seventh shift register groups sequentially transferred along the first direction, data in the eighth shift register groups sequentially transferred along the first direction, the first and the second shift register groups controlling a first set of the plurality of switch circuits corresponding to the plurality of first bit line pairs in the first memory cell array, and the third and the eighth shift register groups controlling a second set of the plurality of switch circuit corresponding to the plurality of second bit line pairs in the second memory cell array, the fourth and the seventh shift register groups controlling a third set of the plurality of switch circuits corresponding to the plurality of third bit line pairs in the third memory cell array, and the fifth and the sixth shift register groups controlling a fourth set of the plurality of switch circuit corresponding to the plurality of fourth bit line pairs in the fourth memory cell array.

11. The semiconductors memory device according to claim 10 further comprising:

a first sense amplifier array having a plurality of first sense amplifier circuits, each first sense amplifier circuit of the first sense amplifier array connected to corresponding one of the plurality of first bit line pairs in the first memory cell array;

a second sense amplifier array having a plurality of second sense amplifier circuits, each second sense amplifier circuit of the second sense amplifier array connected to corresponding one of the plurality of second bit line pairs in the second memory cell array;

a third sense amplifier array having a plurality of third sense amplifier circuits, each third sense amplifier circuit of the second sense amplifier array connected to corresponding one of the plurality of third bit line pairs in the second memory cell array; and a fourth sense amplifier array having a plurality of fourth sense amplifier circuits, each fourth sense amplifier circuit of the fourth sense amplifier array connected to corresponding one of the plurality of fourth bit line pairs in the fourth memory cell array;

wherein the first to the fourth sense amplifier arrays are independently activated.

12. The semiconductor memory device according to claim 11 further comprising: a first register array having a plurality of first registers, in which each first register is connected to corresponding one of the plurality of first bit line pairs in the first memory cell array; and a second register array having a plurality of second registers, in which each second register is connected to corresponding one of the plurality of second bit line pairs in the second memory cell array;

a third register array having a plurality of third registers, in which each third register is connected to corresponding one of the plurality of third bit line pairs in the third memory cell array; and a fourth register array having a plurality of fourth registers, in which each of the fourth register is connected to corresponding one of the plurality of fourth bit line pairs in the fourth registers latch data in the bit line pairs independently .

13. The semiconductor memory device according to claim 12, wherein each first register of the first register array stores data read from the first memory cell array, each second register of the second register array stores data read from the second memory cell array, each third register of the third register array stores data read from the third memory cell array, and each fourth register of the fourth register array stores data read from the fourth memory cell array so that data read from the memory cells are successively outputted through the serial data bus.

14. A semiconductor memory device comprising:

a memory cell array having a plurality of rows and columns of memory cells;

a sense amplifier array coupled to the memory cells of the memory cell array, the sense amplifier array providing complementary data pairs to a plurality of data lines;

a register array that stores a plurality of the complementary data pairs output by the sense amplifier array, the register array having a plurality of registers; and a serial pointer array for selecting corresponding one of the plurality of the complementary data pairs from the register array for output to the plurality of data lines, the serial pointer array including a plurality of serial pointers arranged to maintain a circular shift direction and divided into even numbered serial pointers and odd numbered serial pointers, in which a first serial pointer is selected after a last serial pointer, wherein registers corresponding to the even numbered serial pointers of the plurality of serial pointers are interleaved with registers corresponding to the odd numbered serial pointers of the plurality of serial pointers in such a way that registers corresponding to each succeeding serial pointers are separated by not more than one register.

15. A semiconductor memory device comprising:

a memory cell array having a plurality of rows and columns of memory cells and receiving complementary data pairs from a plurality of data lines;

a register array that stores a plurality of the complementary data pairs received from the plurality of data lines and outputs to the memory cell array, the register array having a plurality of registers; and a serial pointer array for selecting corresponding one of the plurality of the complementary data pairs for input to corresponding one of the plurality of registers, the serial pointer array including a plurality of serial pointers arranged to maintain a circular shift direction and divided into even numbered serial pointers and odd numbered serial pointers, in which a first serial pointer is selected after a last serial pointer, wherein registers corresponding to the even numbered serial pointers of the plurality of serial pointers are interleaved with registers corresponding to the odd numbered serial pointers of the plurality of serial pointers in such a way that registers corresponding to each succeeding serial pointers are separated by not more than one register.

16. A semiconductor memory device comprising:

a plurality of memory cell arrays, each memory cell array of the plurality of memory cell arrays having a plurality of rows and columns of memory cells and providing complementary data pairs to a plurality of data lines;

a register array that stores a plurality of the complementary data pairs output by each memory cell array of the plurality of memory cell arrays, the register array having a plurality of registers; and a serial pointer array for selecting corresponding one of the plurality of the complementary data pairs from the register array for transferring data to the plurality of data lines, the serial pointer array comprising a plurality of serial pointers arranged to maintain a circular shift direction and divided into even numbered serial pointers and odd numbered serial pointers, in which a first serial pointer is selected after a last serial pointer, wherein registers corresponding to the even numbered serial pointers of the plurality of serial pointers are interleaved with registers corresponding to the odd numbered serial pointers of the plurality of serial pointers in such a way that registers corresponding to each succeeding serial pointers are separated by not more than one register.

17. A semiconductor memory device according to claim 16, further comprising a sense amplifier array coupled to the plurality of memory all arrays, the sense amplifier array providing the complementary data pairs to the plurality of data lines.

18. A semiconductor memory device comprising:

a plurality of memory cell arrays, each memory cell array of the plurality of memory cell arrays having a plurality of rows and columns of memory cells and receiving complementary data pairs from a plurality of data lines;

a register array that stores a plurality of the complementary data pairs received from the plurality of data lines and outputs to each memory cell array of the plurality of memory cell arrays, the register array having a plurality of registers; and a serial pointer array for selecting corresponding one of the plurality of the complementary data pairs for input to corresponding one of the plurality of registers, the serial pointer array comprising a plurality of serial pointers arranged to maintain a circular shift direction and divided into even numbered serial pointers and odd numbered serial pointers, in which a first serial pointer is selected after a last serial pointer, wherein registers corresponding to the even numbered serial pointers of the plurality of serial pointers are interleaved with registers corresponding to the odd numbered serial pointers of the plurality of serial pointers in such a way that registers corresponding to each succeeding serial pointers are separated by not more than one register.

19. A semiconductor memory device comprising:

a memory cell array having a plurality of rows and columns of memory cells;

a sense amplifier array coupled to the memory cells of the memory cell array, the sense amplifier array providing complementary data pairs to a plurality of data lines;

a register array that stores a plurality of the complementary data pairs output by the sense amplifier array, the register array having a plurality of registers; and a serial pointer array having a plurality of serial pointers, each serial pointer of the plurality of serial pointers selecting two adjacent complementary data pairs from the register array for output to the plurality of data lines, the serial pointer array comprising a plurality of serial pointers arranged to maintain a circular shift direction and divided into even numbered serial pointers and odd numbered serial pointers, in which a first serial pointer is selected after a last serial pointer, wherein each two adjacent register pairs from the register array corresponding to the even numbered serial pointers of the plurality of serial pointers are interleaved with each two adjacent register array pairs from the register array corresponding to the odd numbered serial pointers of the plurality of serial pointers in such a way that each two adjacent register pairs corresponding to each succeeding serial pointers are separated by not more than one set of two adjacent register pairs.

20. A semiconductor memory device comprising:

a memory cell array having a plurality of rows and columns of memory cells and receiving complementary data pairs to a plurality of data lines;

a register array that stores a plurality of the complementary data pairs received from the plurality of data lines and outputs to the memory cell array, the register array having a plurality of registers; and a serial pointer array having a plurality of serial pointers, each serial pointer of the plurality of serial pointers selecting two adjacent complementary data pairs from the register array input to corresponding one of the plurality of registers, the serial pointer array comprising a plurality of serial pointers arranged to maintain a circular shift direction and divided into even numbered serial pointers and odd numbered serial pointers, in which a first serial pointer is selected after a last serial pointer, wherein each two adjacent register pairs from the register array corresponding to the even numbered serial pointers of the plurality of serial pointers are interleaved with each two adjacent register array pairs from the register array corresponding to the odd numbered serial pointers of the plurality of serial pointers in such a way that each two adjacent register pairs corresponding to each succeeding serial pointers are separated by not more than one set of two adjacent register pairs.

* * * * *

UNITED STATES PATENT AND TRADEMARK OFFICE
CERTIFICATE OF CORRECTION

PATENT NO. : 5,561,633
DATED : October 1, 1996
INVENTOR(S) : SATOSHI YAMANO

It is certified that error appears in the above-indentified patent and that said Letters Patent is hereby corrected as shown below:

On the title page, insert the following: --[30] Foreign Application Priority Data September 29, 1993[JP] Japan...5-243206--

Signed and Sealed this

Twenty-eighth Day of October, 1997

Attest:

BRUCE LEHMAN

*Attesting Officer*    *Commissioner of Patents and Trademarks*